United States Patent
Costello et al.

(10) Patent No.: US 6,754,894 B1
(45) Date of Patent: Jun. 22, 2004

(54) WIRELESS SOFTWARE AND CONFIGURATION PARAMETER MODIFICATION FOR MOBILE ELECTRONIC DEVICES

(75) Inventors: Edward J. Costello, Pleasanton, CA (US); Albert W. Wegener, Portola Valley, CA (US); Serge Swerdlow, Palo Alto, CA (US); Jonathan Voichick, San Mateo, CA (US); Thomas M. Linden, Los Gatos, CA (US)

(73) Assignee: Command Audio Corporation, San Mateo, CA (US)

( * ) Notice: Subject to any disclaimer, the term of this patent is extended or adjusted under 35 U.S.C. 154(b) by 0 days.

(21) Appl. No.: 09/454,901

(22) Filed: Dec. 3, 1999

(51) Int. Cl.[7] ............................. G06F 9/44; H04M 3/00
(52) U.S. Cl. ..................... 717/169; 714/704; 455/419
(58) Field of Search ..................... 714/704; 375/347; 455/500, 420–468, 503; 717/169, 101–105

(56) References Cited

U.S. PATENT DOCUMENTS

| | | | |
|---|---|---|---|
| 4,551,842 A | * 11/1985 | Segarra | ...................... 714/704 |
| 4,841,526 A | * 6/1989 | Wilson et al. | ............... 714/704 |
| 5,406,626 A | 4/1995 | Ryan | |
| 5,491,838 A | 2/1996 | Takahisa et al. | |
| 5,524,051 A | 6/1996 | Ryan | |
| 5,577,266 A | 11/1996 | Takahisa et al. | |
| 5,590,195 A | 12/1996 | Ryan | |
| 5,642,397 A | * 6/1997 | Agbaje-Anozie | ........... 370/313 |
| 5,659,596 A | * 8/1997 | Dunn | ......................... 455/456 |
| 5,745,532 A | * 4/1998 | Campanna, Jr. | ............ 375/347 |
| 5,751,806 A | 5/1998 | Ryan | |
| 5,809,472 A | 9/1998 | Morrison | |
| 5,815,671 A | 9/1998 | Morrison | |
| 5,889,474 A | 3/1999 | LaDue | |
| 5,926,624 A | 7/1999 | Katz et al. | |
| 5,974,312 A | * 10/1999 | Hayes, Jr. et al. | .......... 455/419 |
| 5,982,281 A | 11/1999 | Layson, Jr. | |
| 6,192,340 B1 | * 2/2001 | Abecassis | .................... 704/270 |
| 6,285,886 B1 | * 9/2001 | Kamel et al. | ................ 455/522 |
| 6,370,391 B1 | * 4/2002 | Lietsalmi et al. | ........... 455/466 |

FOREIGN PATENT DOCUMENTS

| | | | |
|---|---|---|---|
| EP | 0 772 367 | 5/1997 | ............ H04Q/7/32 |
| EP | 0 959 635 | 11/1999 | ............ H04Q/7/32 |
| WO | WO 97/26718 | 7/1997 | ............ H04Q/7/22 |

* cited by examiner

Primary Examiner—Tuan Dam
Assistant Examiner—Chuck Kendall
(74) Attorney, Agent, or Firm—Morrison & Foerster LLP

(57) ABSTRACT

Multiple copies of a software or operating parameter change are broadcast using a wireless signal to a mobile electronic device. Broadcasting multiple copies increases the probability that the device will receive the change without error.

64 Claims, 5 Drawing Sheets

WIRELESS SOFTWARE AND CONFIGURATION PARAMETER MODIFICATION FOR MOBILE ELECTRONIC DEVICES

BACKGROUND

1. Field of Invention

The present invention relates to wireless information delivery systems, and in particular to delivering software and operating parameter updates to receivers in a broadcast information delivery system.

2. Related Art

Consumer-oriented wireless (radio) information systems that deliver selected programs to users are becoming available. Such information delivery systems typically include a mobile electronic device (e.g., a portable radio receiver) that receives and stores information contained in a program information signal. The mobile device later outputs selected stored programs that the user designates. U.S. Pat. Nos. 5,406,626, 5,524,051, 5,751,806, 5,809,472, 5,815,671, and 5,590,195 describe features of such information delivery systems and are incorporated herein by reference.

Many mobile electronic devices are read-only memory (ROM) based. Thus the control software first stored in each device at the point of manufacture cannot be changed. Other mobile devices (e.g., cellular telephones, personal digital assistants, and portable audio players) contain random-access memory (RAM) data storage areas that can be modified. For instance, cellular telephones often contain a user-customized directory that contains the names corresponding to the user's frequently called telephone numbers.

For devices in which software and other stored operating parameters can be modified, the modification is often performed using a one-to-one connection (e.g., wired or wireless modem) to a personal computer. For example, mobile computers (e.g. laptop computers) derive much of their utility by allowing easy and automatic synchronization of stored data files with identically named data files that reside on a larger, fixed computer (e.g. a desktop computer). Similarly, portable audio players, such as the Rio(TM) portable player manufactured by Diamond Multimedia Systems, Inc., derive nearly all utility from their changeable data content. For example, several songs can be downloaded from a stationary terminal, such as a personal computer, to the smaller, mobile device which is then subsequently used:to output the song to the user.

The operating software in some portable electronic devices, such as personal digital assistants, can be modified by downloading new software over the one-to-one link that is subsequently stored and executed by such devices. This modification capability significantly extends the device's utility because new software can enable the device to offer features and services not originally available when the device was manufactured. However, the updating typically requires the use of acknowledged transfers (handshaking) of fixed-size blocks of data. Without such acknowledged transfers, correct software upgrades cannot be guaranteed. Furthermore, in information delivery systems in which many mobile units are in use, software upgrades for many devices are delayed, or do not occur, because users do not modify the software in a timely fashion. What is required is a more reliable method of updating software in mobile electronic devices.

SUMMARY

Executable software programs and related operating parameters are changed in a mobile electronic device that is associated with an information delivery system by broadcasting a wireless (e.g., radio) signal containing multiple copies of new data. The mobile device uses the new data to be used to update or to change its software or operating parameters. The number of copies (repetitions) of the new data that are broadcast depends on the expected reception error rate and on the desired probability that the receiver will receive the new data without error.

In one embodiment the mobile device is a receiver (of the type described above) that operates continuously and thus continuously monitors the broadcast signal. The receiver has stored in memory at least one administrative program identifier, as compared to content-type program identifiers, that is associated with the new data that the receiver will use to update or change the software or operating parameter. When the new data is broadcast, the receiver determines that the broadcast signal includes the program identifier associated with the new data and accordingly stores the associated new data obtained from the broadcast signal. The receiver then uses the new data to update or change the software or one of the receiver operating parameters.

DETAILED DESCRIPTION

Figure 1:
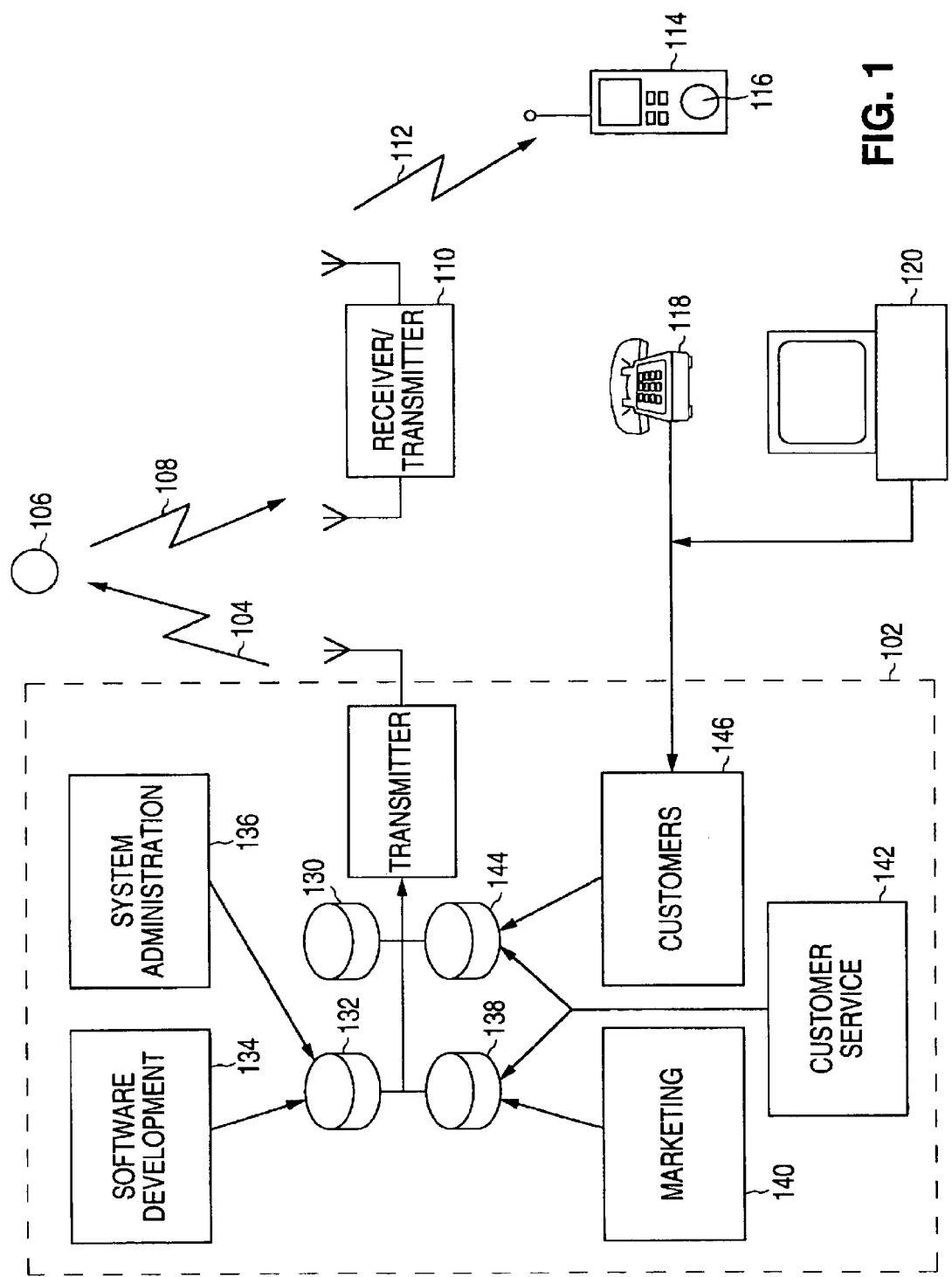
FIG. 1 is a schematic diagram of an information delivery system.

FIG. 1 is a schematic diagram of one embodiment of the invention. Program center 102 transmits uplink signal 104 that contains information digitally encoded in accordance with the invention to satellite 106. Satellite 106 in turn retransmits the encoded information as downlink signal 108 to receiver/transmitter unit 110 which then transmits broadcast signal 112 containing the encoded information to the user's receiver 114 (this satellite distribution is merely exemplary). In some embodiments receiver/transmitter unit 110 broadcasts signal 112 over one or more frequency ranges in unused portions of the commercial frequency modulated (FM) broadcast spectrum (88.0–108.0 megahertz (MHz)); again, this is exemplary.

In the embodiment shown, receiver 114 constantly monitors signal 112 for predetermined encoded information as described below. Encoded information that pertains to system operation is used to modify receiver 114 operation ("software") and encoded information containing information of interest to the user is output to the user ("content"). The depicted system outputs audio programs to the user through speaker 116. Other embodiments may output video programs on a suitable display device (not shown).

Figure 2:
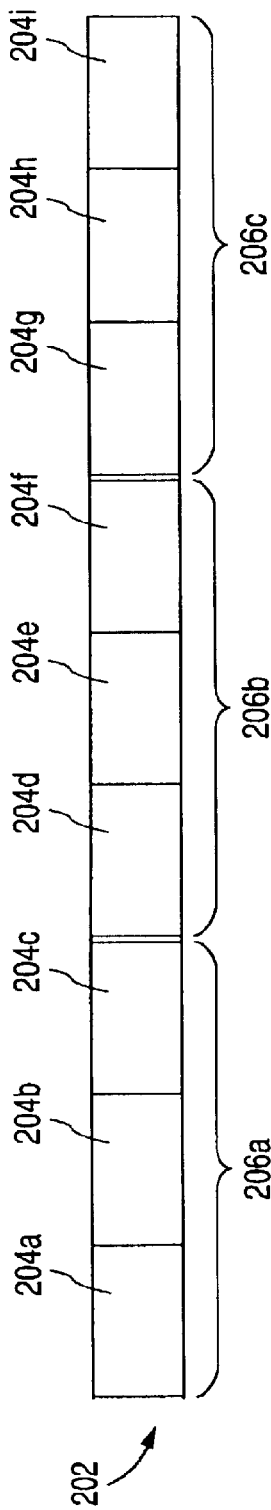
FIG. 2 is an illustration showing a program divided into several parts.

FIG. 2 is a representation of one embodiment of the data structure of program 202 that program center 102 digitally encodes for broadcast. Program 202 can be either information of interest to the user (termed a "feature program" or "content" herein) or information used for operating the receiver (termed an "administrative program" or "software" herein). Administrative programs include executable software programs, or may be one or more of the various parameters the receiver uses to control available functions (optional or required) during operation.

As shown, program 202 is divided into a series of fixed length information packets 204a–204i, although shorter programs may require as few as one packet. Packets 204a–i are separately encoded (including suitable compression and encryption) and broadcast to be reassembled as necessary by receiver 114 upon reception. In this embodiment program 202 is also divided into several segments 206a–206c, each segment containing one or more packets 204a–i. Segments 206 represent logical information groups within program 202 and may be of various lengths. For example, when program 202 is a traffic: report in the San Francisco Bay Area, segment 206a contains the traffic information north of San Francisco; segment 206b, east of San Francisco; and segment 206c, south of San Francisco. The segment lengths vary as the traffic information changes and is updated. As another example, when program 202 is a news program, segments 206a–c contain the first, second, and third news stories, respectively. Thus a segment represents the granularity of program content as the system users expect.

Figure 3:
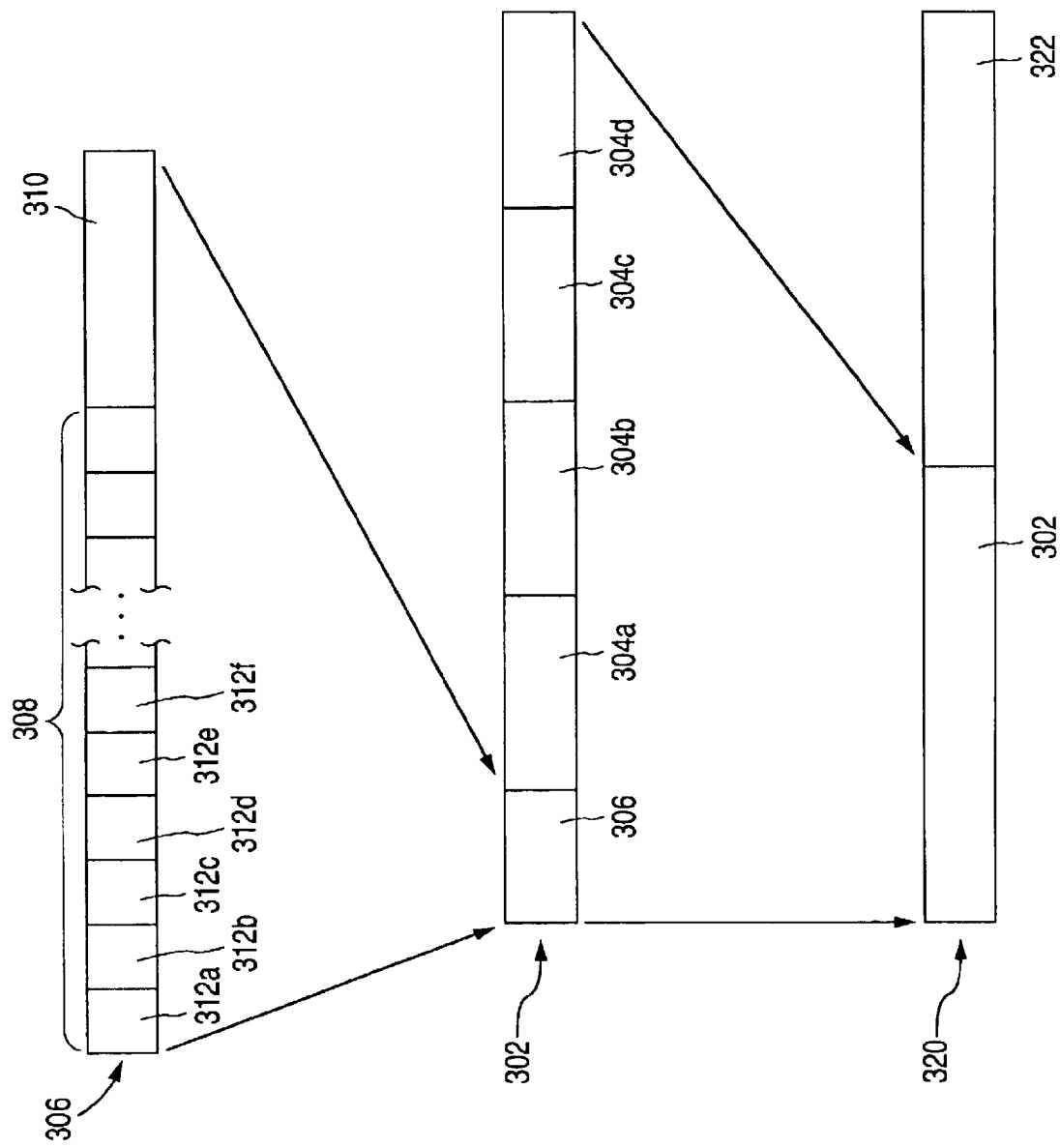
FIG. 3 is an illustration of several portions of a data frame.

FIG. 3 is a representation of the data structure of one embodiment of the information encoded in broadcast signal 112. FIG. 2 illustrates that individual programs are divided into discrete packets; FIG. 3 shows how those packets are structured for broadcast. As shown, program frame 302 includes four packets 304a–304d and program header 306. Packets 304a–d are packets from broadcast programs such as packets 204a–d shown in FIG. 2. Header 306 includes table of contents information 308 associated with each of the four packets in program frame 302, as well as additional information 310 such as system time, synchronization information, and broadcast frequencies.

Each packet 304a–304d has six associated table of contents entries: the program number which identifies the program (e.g., news, traffic, etc.) to which the packet belongs, the program segment number to which the packet belongs, the packet sequence number identifying where among all packets in the program this packet belongs, the number of packets in the segment, the program edition number which indicates program chronology, and the content type identifier which identifies program content (e.g., speech, audio, text, stock quotes, executable code). Thus associated with packet 304a is program number 312a, segment number 312b, packet number 312c, total packets in segment number 312d, program edition 312e, and content type identifier 312f. Table of contents 308 contains similar information for packets 304b–304d.

FIG. 3 shows that program frame 302 is included in broadcast frame 320. Broadcast frame 320 also includes error protection information 322 that is a byproduct of, for example, conventional convolutional and Reed-Solomon coding. In these embodiments a conventional convolutional coder in program center 102 creates output bits that are conventionally decoded by a conventional Viterbi decoder within receiver 114. The Reed-Solomon encoder outputs 32 check bytes for every 223 input bytes, yielding a total output of 255 bytes per Reed-Solomon frame.

Referring again to FIG. 1, program center 102 includes several information storage systems (databases). Feature program (content) database 130 includes conventionally compressed audio program information for audio output to the user. Some programs use conventional compression methods such as Dolby AC-3® developed by Dolby Laboratories, Inc. Other programs are text-based, and conventional concatenated speech synthesizer software in receiver 114 uses them to produce audio output. These audio programs are periodically updated in database 130. Programs such as traffic reports are frequently updated to provide timely information, whereas entertainment such as weekly news magazines presented in audio form are less frequently updated. Programs are divided into segments (at least one), and then into packets, as described above. Although this embodiment is directed to providing audio output to the user, other embodiments may provide video, text, or graphic outputs.

As described below, receiver 114 contains a microprocessor/microcontroller that controls its operation by executing code (software). While receiver 114 is manufactured with suitable software stored in memory associated with the microprocessor, it may be desirable to later change or update this software. Software development input 134 updates software programs in system database 132 with, for example, corrections to "bugs" in current receiver 114 software. Software development input 134 also provides new software programs that are broadcast to receiver 114 and allow receiver 114 to offer new features to the user.

The receiver also stores in its memory various parameters that are associated with receiver operation. For example, customer service inputs 142 are directed to activation database 138. In one embodiment, information in activation database 138 is encrypted using conventional methods. One customer service input turns on (activates) or off (deactivates) a user's subscription to programs offered over the system. Each receiver 114 is assigned a unique identification code (e.g., an 11-digit alphanumeric code) that is both internally stored and externally printed on the receiver housing. For initial subscription, the user contacts the customer service function, using telephone 118 for example, and gives the receiver's identification number to a service representative. The representative configures an activation code in activation database 138 that when broadcast is received and decoded by receiver 114, allowing receiver 114 to receive programs. (This is in the context of a subscription service, like cable television or cellular telephones.) Service is terminated using a similar procedure and a deactivation code. In some embodiments premium services offering additional programs or service options may be activated and deactivated using similar activation and deactivation codes.

Other inputs are directed to the program center databases. For example, marketing inputs 140 may include data to be output to the user announcing new services. Other customer service inputs 142 may include information regarding the user's home service area (home market code), information regarding selected markets offering services to the user (enabled markets code), and information regarding the user's original service provider (service provider code).

Configuration database 144 contains information that controls receiver 114's operating configuration. Database 144 receives customer service inputs 142 and in some embodiments receives customer inputs 146. These options may include customized audio program playlists and customized financial portfolio data containing one or more stock exchange ticker symbols. In some embodiments, customers may select some operating parameters by using telephone 118 to access a conventional menu of choices, or by using personal computer 120 to make selections on a network server (e.g. a World-Wide Web server). The inputs and databases shown are illustrative; other inputs and databases may be used.

Figure 4:
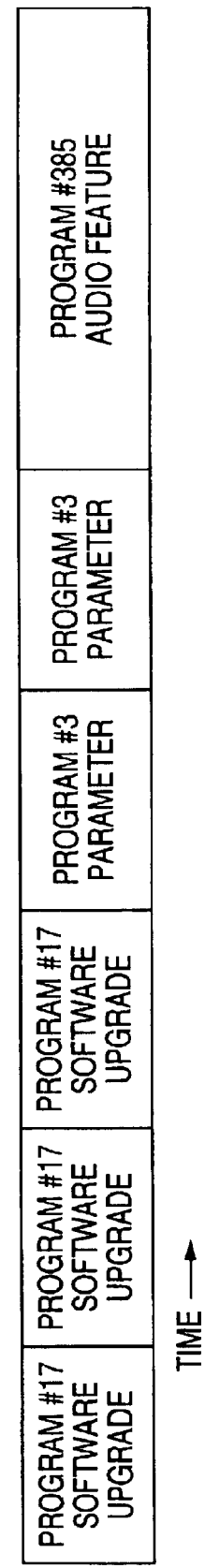
FIG. 4 is an illustration of program information contained in a broadcast signal.

The various administrative and feature programs are broadcast in a time-ordered stream. FIG. 4 illustrates one embodiment of a portion of the broadcast signal showing such a stream. As shown, the broadcast stream contains several programs, each containing program information as described above. In some embodiments program information from two or more packets is interleaved in a single frame so as to minimize packet loss if the program frame is corrupted by, for example, noise. For simplicity, however, the programs illustrated in FIG. 4 are shown non-interleaved.

Each program is assigned a unique program number. Shown, for example, is program number 17 containing software upgrade information, program number 3 containing operating parameter information (e.g., activation information), and program number 385 containing a feature program. In accordance with the invention, to ensure that the receiver reliably receives administrative program updates, more than one copy of each administrative program is broadcast sequentially over time. As shown in FIG. 4 for instance, program number 3 containing new parameter data is broadcast twice and program number 17 containing new software data is broadcast three times. In some embodiments multiple copies of each program are broadcast back-to-back as shown. In other embodiments a time delay is placed between the broadcast of each copy. Repeated broadcasts increase the probability that receiver 114 will receive a valid program.

Table I illustrates the sequential, exponential improvement in reliable (error-free) reception when multiple program copies are broadcast. In this example, a software update is transmitted when the likelihood of a given bit being received without error is 0.8 (0.2 error rate). Thus after one transmission the probability is 20 percent (0.2) that the receiver will not have received the upgrade. After a second transmission, the probability is 20 percent that the non-upgraded receiver will still not receive the update, producing an overall non-upgrade probability of 4 percent (0.04). As shown in Table I, the likelihood of a receiver receiving the update increases to a high level with multiple transmissions.

TABLE I

| Number of transmissions: | 1 | 2 | 3 | 4 | 5 |
|---|---|---|---|---|---|
| Percent non-upgraded receivers: | 20% | 4% | 0.8% | 0.16% | 0.032% |
| Percent upgraded receivers: | 80% | 96% | 99.2% | 99.84% | 99.968% |

In general, where R is the probability that one copy of the new data will be received in error, N is =the number of copies transmitted, and P is the desired fraction of receivers to correctly receive the new data:

$$P = (1-R)^N$$

The number of copies that must be broadcast to achieve the desired fraction P is therefore:

$$N = \frac{\log P}{\log(1-R)}$$

Since N must be a discrete number, the actual number of copies that must be broadcast to ensure that the desired fraction P of receivers correctly receive the new data is:

$$N \geq 1 + \left| \frac{\log P}{\log(1-R)} \right|$$

Figure 5:
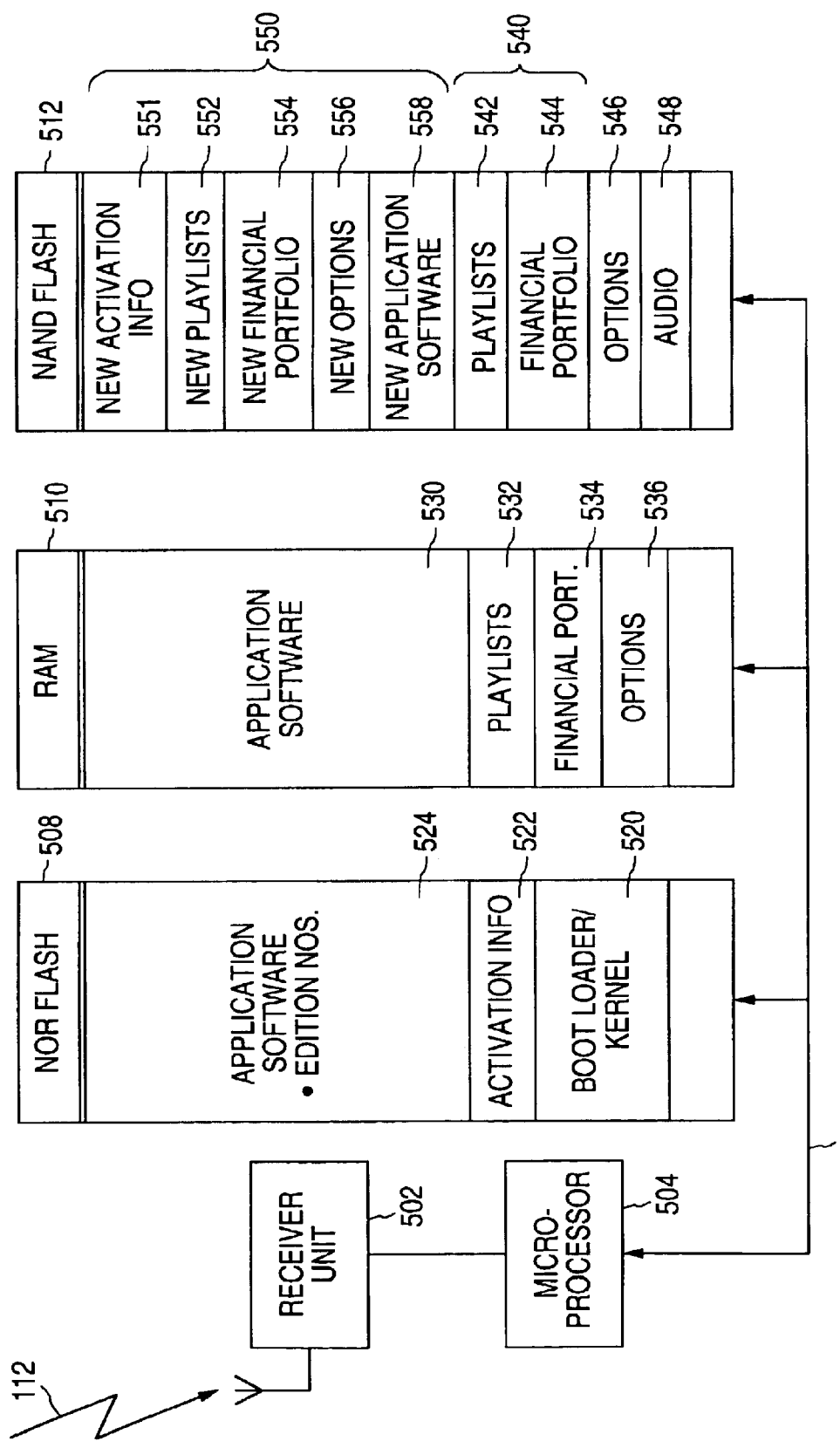
FIG. 5 is a schematic block diagram of an embodiment of a receiver used in an information delivery system.

FIG. 5 is a block diagram showing one embodiment of receiver 114. As shown, radio receiver unit 502 and microprocessor 504 are electrically coupled. Microprocessor 504 is electrically coupled by address and data bus 506 to conventional NOR flash memory 508 (e.g., an AM29LV400BB-120E memory chip, manufactured by Advanced Micro Devices, Inc.), conventional random access memory (RAM) 510, and conventional NAND flash memory 512 (e.g., a TH58V128FT memory chip, manufactured by Toshiba, Inc.). Data stored in non-volatile NOR flash memory 508 can be accessed byte-by-byte and hence microprocessor 504 can execute programs stored in memory 508. Similarly, microprocessor 504 can execute programs stored in volatile RAM 510. Data stored in non-volatile NAND flash memory 512 is stored in subdivisions larger than one byte, and therefore microprocessor 504 cannot execute programs stored in memory 512. However, NAND flash memory is used because it is less expensive than NOR flash memory.

In one embodiment receiver 114 is powered either by a battery (e.g., a RENEWAL® manufactured by RAY-O-VAC, Inc.) (not shown) or an external power source (e.g., conventional AC wall power or DC automobile power) that also recharges the battery. Thus receiver 114 operates continuously (always on) and continuously receives the broadcast signal. Wireless receiver unit 502 receives broadcast signal 112 and tunes, downconverts, demodulates, and recovers program information from the program frames in signal 112. Receiver unit 502 passes to microprocessor 504 the program number, segment number, packet number, total number of program packets, content type identifier and the-program content for each packet received. Microprocessor 504 executes a process described below to determine the necessary action a particular program packet requires.

NOR flash memory 508 contains boot loader/kernel 520, activation information 522, and application software programs 524. Boot loader/kernel 520 is not modified, but activation information 522 and application software 524 may be modified by program information contained in signal 112.

NAND flash memory 512 contains feature program capture information 540 that microprocessor 502 uses to determine which feature programs to store. Capture information 540 includes information such as audio playlists 542 and user financial portfolio data 544 (e.g., stock ticker symbols). Memory 512 also contains options settings 546 such as those governing receiver actions as described above with respect to activation database 138 and configuration database 144. Both capture information 540 and options settings 548 can be modified by program information from signal 112.

Information from signal 112 is stored in memory 512. New content includes, for example, audio data 548. New administrative information 550 includes, for example, new activation information 551, new playlists 552, new financial portfolio data 554, new options settings 556, and new application software 558. This new information 550 is used to update information currently in receiver 114 memories as described below.

RAM 510 contains at least a portion of information from memories 508 and 512. Thus as shown in this embodiment RAM 510 contains at least a portion 530 of application software 524, as well as other information such as playlists 532, financial portfolio data 534, and options settings 536 from memory 512.

Figure 6:
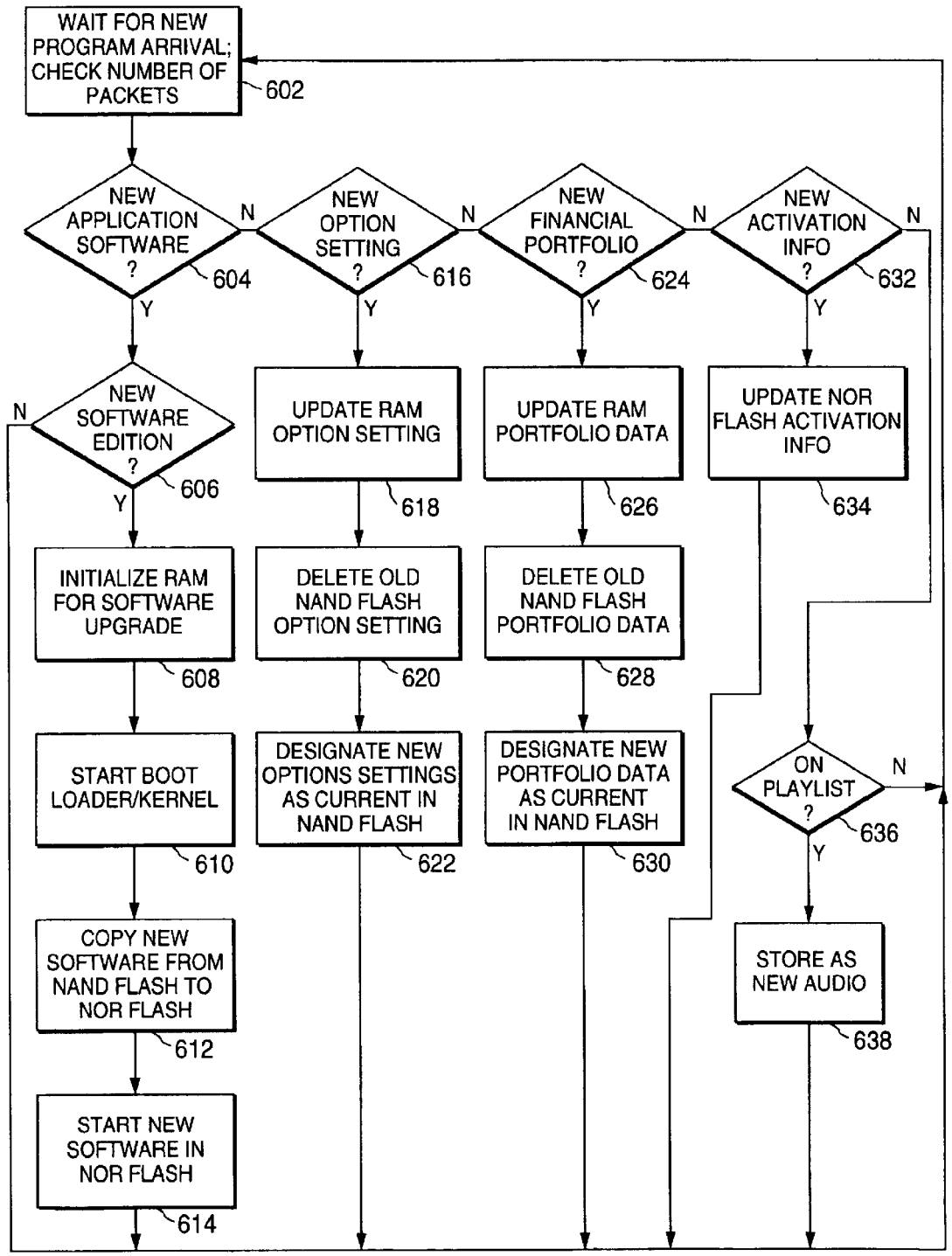
FIG. 6 is a flow diagram showing actions performed by a microprocessor executing code.

FIG. 6 is a flow chart showing actions carried out by software associated with microprocessor 504 in one embodiment of the invention (coding such software would be readily accomplished in light of this disclosure). In 602 the microprocessor waits until a new program arrives and, for administrative (software, parameters) programs, determines that all packets associated with the program have been received. In 604 the microprocessor determines by examining the program number if the program is new application software. Selected program numbers identifying new software update programs are preloaded and stored in the receiver. Accordingly, the microprocessor always monitors broadcast signal information for software upgrades. If the program information is new application software, the microprocessor determines if the new application software has already been received by comparing the edition number associated with the new program 558 with the edition number associated with the current application software 524. As shown in 606, if the receiver has already successfully processed the new software from a preceding broadcast, the microprocessor returns to 602 and waits for another program. If the new software has not been processed, the microprocessor continues the upgrade process.

In 608 the microprocessor conventionally initializes the RAM. Then, the microprocessor starts the boot loader/kernel as shown in 610. After starting the boot loader/kernel, the microprocessor moves to 612 and copies new application software 558 from NAND flash memory 512 to NOR flash memory 508. The microprocessor then starts to execute new application software 524 from the NOR flash memory, as depicted by 614. User service interruptions are minimized by broadcasting new application software during minimum use periods. Control returns to 602 when the new application software is updated and operating.

If the program information is not new software, the microprocessor next determines if the program contains new options settings as shown in 616. If the program contains new options settings 556, the microprocessor uses the new settings to update RAM options settings 536, delete old options settings 546 in the NAND flash memory 512, and designate new options settings 556 as current, as shown by 618, 620, and 622 respectively. After 622 the control returns to 602.

In one embodiment, if the program information does not contain new options settings, the microprocessor next determines if the program contains new financial portfolio data at 624. If the program contains new portfolio data, the microprocessor uses the new data 554 to update RAM portfolio data 534, delete old portfolio data 544 in NAND flash memory 512, and designate new portfolio data as current, as shown by 626, 628, and 630 respectively. After 630 the control returns to 602. A similar procedure is used to update playlists 532 and 542 using new playlists 552. The use of financial portfolio and playlist information is illustrative.

If the program information does not contain new financial portfolio information, the microprocessor determines if the program contains new activation information at 632. If so, the microprocessor updates the activation information 522 stored in NOR flash memory 508 as shown by 634 and returns to 602.

In 636 the microprocessor compares the new program identifier to program identifiers stored in one or more RAM playlists 532. If the new program identifier is on the playlist, the microprocessor stores the program as audio data 548 in NAND flash memory 512 and returns to 602. If the new program identifier is not contained in a playlist, the microprocessor ignores the program data and returns to 602.

The scope of the present invention extends beyond the specific embodiments described above, and is therefore limited only by the following claims.

We claim:

1. A method of transmitting information, comprising the acts of:
    inserting multiple copies of software information into a signal, wherein the software information is used to operate a mobile electronic device receiving the software information;
    inserting feature program information into the signal, wherein the feature program information received by the mobile electronic device is subsequently output by the mobile electronic device to a user of the mobile electronic device;
    inserting a program identifier into the signal, wherein the program identifier enables the mobile electronic device to distinguish the software information from the feature program information; and
    broadcasting the signal as a wireless signal to a plurality of mobile electronic devices in an information distribution system, wherein the number N of multiple copies is an integer and $$N \geq 1 + \left\lceil \frac{\log P}{\log(1-R)} \right\rceil$$

where P is a predetermined minimum acceptable fraction of mobile electronic devices correctly receiving the software information and R is a reception error rate.

2. The method of claim 1, wherein the software information comprises a software program executable by an information processor in the mobile device.

3. The method of claim 1, wherein the software information comprises a change to a software program previously stored in the mobile device.

4. The method of claim 1 further comprising the act of inserting a particular edition number into the signal, wherein the particular edition number enables the mobile electronic device to distinguish the inserted software information from another version of the software information previously stored in the mobile electronic device, the inserted and previously stored versions of the software information both being associated with the same program identifier.

5. The method of claim 1, wherein the software information comprises a parameter used to operate the mobile device.

6. The method of claim 1, wherein the software information comprises a change to a parameter previously stored in the mobile device.

7. The method of claim 1, wherein the software information comprises an activation code associated with the mobile device.

8. The method of claim 1, wherein the software information comprises a home market code associated with the mobile device.

9. The method of claim 1, wherein the software information comprises an enabled markets code associated with the mobile device.

10. The method of claim 1 wherein the software information comprises a service provider code associated with the mobile device.

11. The method of claim 1, wherein the software information comprises an option setting associated with the mobile device.

12. The method of claim 1, further comprising the act of inserting error-protection information into the signal, wherein the error-protection information is associated with the software information.

13. The method of claim 1, wherein the software information comprises a playlist that includes a feature program.

14. The method of claim 1, wherein the software information comprises financial portfolio data for the user.

15. The method of claim 1, wherein the software information comprises a segment, and wherein the segment comprises at least one packet.

16. The method of claim 1, wherein the feature program comprises an audio program.

17. The method of claim 1, wherein the feature program comprises a video program.

18. The method of claim 1, wherein the feature program comprises financial data.

19. The method of claim 1, wherein the feature program comprises motor vehicle traffic information.

20. The method of claim 1, wherein the feature program comprises text or graphics.

21. A wireless broadcast signal comprising:
    multiple copies of software information, wherein the software information is used to operate a mobile electronic device receiving the software information;
    feature program information, wherein the feature program information received by the mobile electronic device is subsequently output by the mobile electronic device to a user of the mobile electronic device; and
    a program identifier, wherein the program identifier enables the mobile electronic device to distinguish the software information from the feature program information,
    wherein the number N of multiple copies is an integer and $$N \geq 1 + \left\lfloor \frac{\log P}{\log(1-R)} \right\rfloor$$

where P is a predetermined acceptable fraction of mobile electronic devices correctly receiving the software information and R is a reception error rate.

22. The signal of claim 21, wherein the software information comprises a software program executable by an information processor in the mobile device.

23. The signal of claim 21, wherein the software information comprises a change to a software program previously stored in the mobile device.

24. The signal of claim 21, wherein the signal further comprises a particular edition number, wherein the particular edition number enables the mobile electronic device to distinguish the software information in the signal from another version of the software information previously stored in the mobile electronic device, the signal and previously stored versions of the software information both being associated with the same program identifier.

25. The signal of claim 21, wherein the software information comprises a parameter used to operate the mobile device.

26. The signal of claim 21, wherein the software information comprises a change to a parameter previously store in the mobile device.

27. The signal of claim 21, wherein the software information comprises an activation code associated with the mobile device.

28. The signal of claim 21, wherein the software information comprises a home market code associated with the mobile device.

29. The signal of claim 21, wherein the software information comprises an enabled markets code associated with the mobile device.

30. The signal of claim 21, wherein the software information comprises a service provider code associated with the mobile device.

31. The signal of claim 21, wherein the software information comprises an option setting associated with the mobile device.

32. The signal of claim 21, wherein the signal further comprises error-protection information, and wherein the error-protection information is associated with the software information.

33. The signal of claim 21, wherein the software information comprises a playlist that includes a feature program.

34. The signal of claim 21, wherein the software information comprises financial portfolio data for the user.

35. The signal of claim 21, wherein the software information comprises a segment, and wherein the segment comprises at least one packet.

36. The signal of claim 21, wherein the feature program comprises a segment, and wherein the segment comprises at least one packet.

37. The signal of claim 21, wherein the feature program comprises an audio program.

38. The signal of claim 21, wherein the feature program comprises a video program.

39. The signal of claim 21, wherein the feature program comprises financial data.

40. The signal of claim 21, wherein the feature program comprises motor vehicle traffic information.

41. The signal of claim 21, wherein the feature program comprises text or graphics.

42. A transmitter in an information distribution system, wherein the transmitter broadcasts a wireless signal to a plurality of mobile electronic devices, and wherein the signal comprises:
    multiple copies of software information, wherein the software information is used to operate a mobile electronic device receiving the software information;
    feature program information, wherein the feature program information received by the mobile electronic device is subsequently output by the mobile electronic device to a user of the mobile electronic device; and
    a program identifier, wherein the program identifier enables the mobile electronic device to distinguish the software information from the feature program information, wherein the number N of multiple copies is an integer and $$N \geq 1 + \left\lfloor \frac{\log P}{\log(1-R)} \right\rfloor$$

where P is a predetermined minimum acceptable fraction of the mobile electronic devices correctly receiving the software information and R is a reception error rate.

43. The transmitter of claim 42, wherein the software information comprises a software program executable by an information processor in the mobile device.

44. The transmitter of claim 42, wherein the software information comprises a change to a software program previously stored in the mobile device.

45. The transmitter of claim 42, wherein the signal further comprises a particular edition number, wherein the particular edition number enables the mobile electronic device to distinguish the software information in the signal from another version of the software information previously stored in the mobile electronic device, the signal and previously stored versions of the software information both being associated with the same program identifier.

46. The transmitter of claim 42, wherein the software information comprises a parameter used to operate the mobile device.

47. The transmitter of claim 42, wherein the software information comprises a change to a parameter previously stored in the mobile device.

48. The transmitter of claim 42, wherein the software information comprises an activation code associated with the mobile device.

49. The transmitter of claim 42, wherein the software information comprises a home market code associated with the mobile device.

50. The transmitter of claim 42, wherein the software information comprises an enabled markets code associated with the mobile device.

51. The transmitter of claim 42, wherein the software information comprises a service provider code associated with the mobile device.

52. The transmitter of claim 42, wherein the software information comprises an option setting associated with the mobile device.

53. The transmitter of claim 42, wherein the signal further comprises error-protection information, and wherein the error-protection information is associated with the software information.

54. The transmitter of claim 42, wherein the software information comprises a playlist that includes a feature program.

55. The transmitter of claim 42, wherein the software information comprises financial portfolio data for the user.

56. The transmitter of claim 42, wherein the software information comprises a segment, and wherein the segment comprises at least one packet.

57. The transmitter of claim 42, wherein the feature program comprises a segment, and wherein the segment comprises at least one packet.

58. The transmitter of claim 42, wherein the feature program comprises an audio program.

59. The transmitter of claim 42, wherein the feature program comprises a video program.

60. The transmitter of claim 42, wherein the feature program comprises financial data.

61. The transmitter of claim 42, wherein the feature program comprises motor vehicle traffic information.

62. The transmitter of claim 42, wherein the feature program comprises text or graphics.

63. The method of claim 42, wherein the mobile electronic devices do not transmit an acknowledgement of receipt of the broadcast signal.

64. The method of claim 1, wherein the feature program comprises a segment, and wherein the segment comprises at least one packet.

* * * * *